W. J. DILTZ.
MACHINES FOR SOWING FERTILIZERS.
No. 185,083. Patented Dec. 5, 1876.
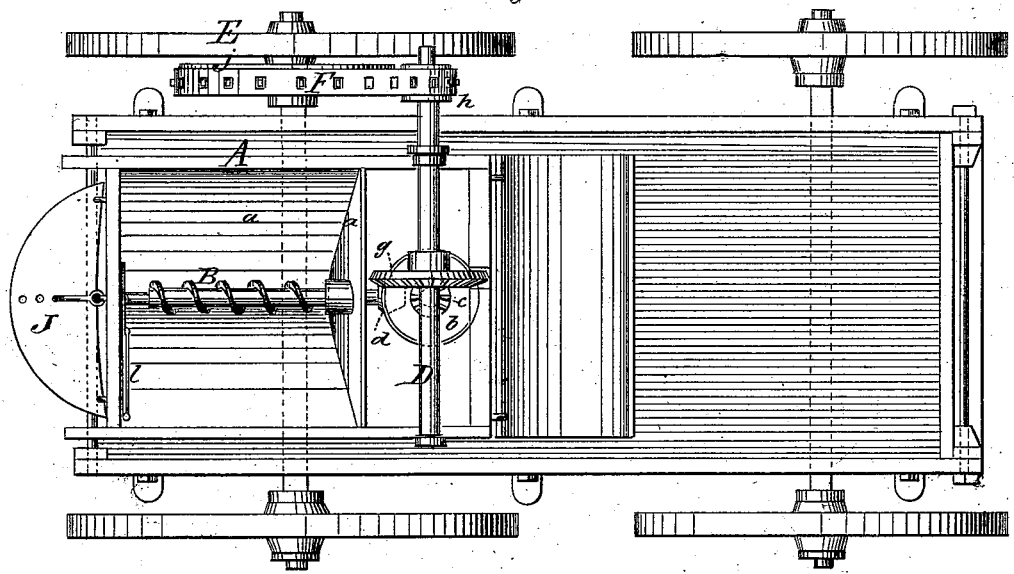
Fig. 1.
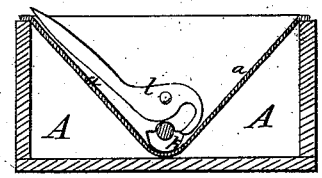
Fig. 4.
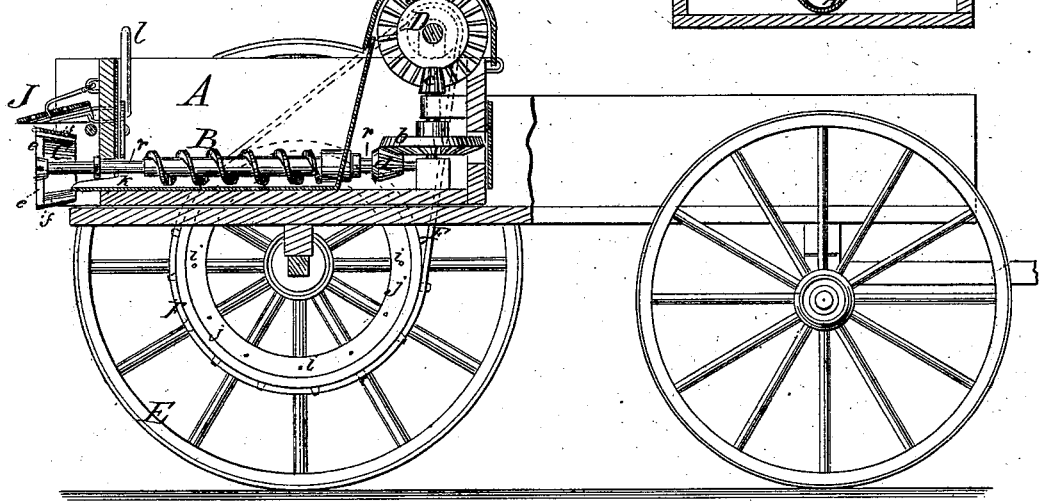
Fig. 2.
Witnesses:
Fig. 3.
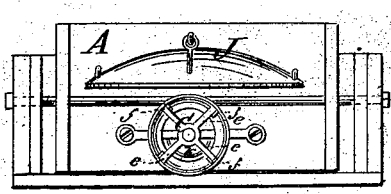
Inventor:
William J. Diltz
N. PETERS, PHOTO-LITHOGRAPHER, WASHINGTON, D. C.

UNITED STATES PATENT OFFICE.

WILLIAM J. DILTZ, OF NORTH BRANCH DEPOT, NEW JERSEY.

IMPROVEMENT IN MACHINES FOR SOWING FERTILIZERS.

Specification forming part of Letters Patent No. 185,083, dated December 5, 1876; application filed February 28, 1876.

*To all whom it may concern:*

Be it known that I, WILLIAM J. DILTZ, of North Branch Depot, in the county of Somerset and State of New Jersey, have invented a new and useful Improvement in Machines for Sowing Fertilizers, &c.; and that the following is a full, clear, and exact description of the same, reference being had to the accompanying drawings, and to the letters of reference marked thereon, making part of this specification.

This invention is in the nature of an improvement in machines for sowing fertilizers; and the invention consists in a machine for sowing fertilizers constructed with a carrier for forcing the fertilizing material to the sower; and also a shield or hood fitted above the sower, as an additional means for scattering the fertilizer or substance to be sown, substantially as hereinafter more particularly described.

In the accompanying sheet of drawings, Figure 1 is a plan or top view of my machine. Fig. 2 is a side view of same, partly in section; Fig. 3, an end view, showing sower and hood; and Fig. 4 a section, showing gate for regulating escape of fertilizing material.

Similar letters of reference indicate like parts in the several figures.

A represents a box of any convenient size or form. Within this box is fitted a metallic or other lining, $a$, with sides curved or tapering; and also within the box A, but not within the metallic lining, is fitted in suitable bearings a bevel-wheel, $b$, and onto the shaft of this bevel-wheel, and immediately above its bearing, is secured a bevel-pinion, $c$. Within the metal lining $a$, and near the bottom of the same, is a screw-carrier, B, arranged on a shaft, $r$. The inner end of this carrier-shaft $r$ has fitted to it a bevel-pinion, $d$, which fits into, and engages with, the gears of the bevel-wheel $b$, and the outer end of this same shaft $r$ carries a funnel-shaped sower, C. This sower is open at each of its ends, flaring slightly outward, and it is provided with four radial arms, $e$ $e$, and with fins $f$ $f$. Secured in suitable bearings is a cross-shaft, D. This cross-shaft has a bevel-gear wheel, $g$, affixed to it, which meshes into the bevel-pinion $c$; and also to the cross-shaft D is fixed a pulley-wheel, $h$, and secured to the spokes of one of the hind wheels, E, of an ordinary wagon by hook-bolts $i$ is a drum or driving-pulley, $j$. Around this drum and the pulley-wheel $h$ on the cross-shaft passes the driving-belt F. To the front end of the box A on its outer side, and immediately above the sower C, is a hood, J. This hood is hinged to the end of the box A, so that it may be inclined at any angle desired, and held at such angle in any suitable way.

My machine for sowing fertilizers being constructed substantially as above described, its operation is as follows: The fertilizing material to be sown is placed into the metal-lined receptacle $a$, the box A containing it having been placed in the rear of any suitable wagon with the tail-board removed. The team being started, motion is imparted to the wheel E, on which is the drum or driving-pulley $j$. This motion is at once transmitted by the driving-belt F and the pulley-wheel $h$ to the cross-shaft D, causing the bevel-gear wheel $g$ thereon to revolve, and thereby impart motion through the bevel-pinion $c$ to the bevel-wheel $b$, which, in turn, imparts a rapid rotary motion to the screw-carrier B and to the sower C. Now, as the carrier B revolves, the fertilizing material, which is placed within the metal-lined receptacle $a$, is forced backward and through an aperture, $k$, in the said lined case, into the sower, which, revolving rapidly, throws or scatters the fertilizer by reason of centrifugal force, over a considerable area. The fins $f$ $f$ assist in catching, retaining, and throwing the fertilizer, which might otherwise, to some extent, pass through the sower without being practically scattered. The arms $e$ $e$ tend to stiffen and support the periphery of the sower.

The quantity of fertilizing material that is to be sown may be regulated by a gate, $l$, so as to more or less close the aperture $k$ in the receptacle $a$. To assist in throwing out the fertilizing material, and prevent it to some extent from being thrown up and into the wagon, I affix, immediately above the sower, a shield, J. This is hinged, and may be adjusted to any convenient angle best suited for the particular occasion. As the fertilizing substance is thrown by the sower, its upward flight is checked by this shield, which thereby assists in distributing the substance, and prevents it from finding its way back to the interior of the wagon.

The machine may be supplied with wheels fitted especially to it for the purpose of propulsion; or it may be placed, as before stated, in any suitable wagon. This last method is the most desirable, since the wagon may contain the bulk of the fertilizing material, which may be placed into the metal-lined box from time to time as it is consumed, besides saving expense in construction.

It is obvious that the machine may be employed equally well to sow seeds or grain of any kind, also manures in a liquid or semi-liquid state.

A screen or wire-gauze may be placed over the receptacle A, to prevent the fertilizing material from being thrown out of the receptacle.

Having thus described my invention, what I claim as new, and desire to secure by Letters Patent, is—

1. In a machine for sowing seed and fertilizer, the shaft $r$, carrying the screw B, and sower C, in combination with the hopper, substantially as specified.

2. In a machine for sowing fertilizers, &c., an adjustable shield-plate, fitted immediately above the revolving sower, substantially as and for the purpose described.

WILLIAM J. DILTZ.

Witnesses:
AARON J. ANTEN,
JOHN V. STILLWELL.